(12) United States Patent
Li

(10) Patent No.: US 8,776,193 B2
(45) Date of Patent: Jul. 8, 2014

(54) METHOD, DEVICE, AND SYSTEM TO SHARE INFORMATION BETWEEN MOBILE COMPUTING DEVICES

(75) Inventor: Xintian Li, Cupertino, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 148 days.

(21) Appl. No.: 13/108,120

(22) Filed: May 16, 2011

(65) Prior Publication Data

US 2012/0297466 A1    Nov. 22, 2012

(51) Int. Cl.
*H04L 29/06* (2006.01)
*G06F 21/00* (2013.01)
*G06F 21/10* (2013.01)

(52) U.S. Cl.
CPC ........ *G06F 21/10* (2013.01); *G06F 2221/0788* (2013.01)
USPC ............................................. 726/6; 709/203

(58) Field of Classification Search
None
See application file for complete search history.

(56) References Cited

U.S. PATENT DOCUMENTS

2007/0188323 A1* 8/2007 Sinclair et al. ............. 340/568.1

OTHER PUBLICATIONS

Android Open Source Project, Creative Commons Attribution 2.5, Webpage—Address, "http://developer.android.com/reference/android/location/Address.html", 2011, p. 7, Published in: US.
Bump Technologies, Inc., Webpage, The Bump App for iPhone and Android, "http://bu.mp/", 2011, p. 1, Published in: US.
Android Open Source Project, Creative Commons Attribution 2.5, Webpage—Projects/Platform/hardware/libhardwar_legacy/git/blob, "https://android.git.kernel.org/?p=platform/hardware/libhardware_legacy.git; a=blob;f=include/hardware_legacy/gps.h;h=84ab3487735540539fc9620d901f317bcce2e0f9;hb=HEAD", 2011, p. 9, Published in: US.
Android Open Source Project, Creative Commons Attribution 2.5, Webpage—Location, "http://developer.android.com/reference/android/location/Location.html", 2011, p. 8, Published in: US.
Android Open Source Project, Creative Commons Attribution 2.5, Webpage—Location Listener, "http://developer.android.com/reference/android/location/LocationListener.html", 2011, p. 1, Published in: US.
Android Open Source Project, Creative Commons Attribution 2.5, Webpage—Location Manager, "http://developer.android.com/reference/android/location/LocationManager.html", 2011, p. 15, Published in: US.

* cited by examiner

*Primary Examiner* — Gilberto Barron, Jr.
*Assistant Examiner* — Simon Kanaan
(74) *Attorney, Agent, or Firm* — Neugeboren O'Dowd PC

(57) ABSTRACT

A mobile computing device comprising a first application adapted to provide information to a server. The information is adapted to be shared by the server with at least one additional mobile computing device when the at least one additional mobile computing device is located within a specified range of the mobile computing device. Additionally, a password entered through a second application located on the additional mobile computing device may be required to correspond to a password received from the mobile computing device in order to share the information. Furthermore, the additional mobile computing device may be required to access the information within a specified time period.

20 Claims, 5 Drawing Sheets

METHOD, DEVICE, AND SYSTEM TO SHARE INFORMATION BETWEEN MOBILE COMPUTING DEVICES

FIELD OF THE INVENTION

The present invention relates to mobile computing devices. In particular, but not by way of limitation, the present invention relates to securely sharing content between mobile computing devices and between mobile devices and the internet.

BACKGROUND OF THE INVENTION

Currently, there are applications available to mobile computing device users that enable the users to share information between mobile computing devices. Such applications may allow users to select content on a mobile computing device and subsequently share the content with a second mobile computing device also using the same application. Although such applications seem to create an effective way to share content, such applications fail to provide sufficient security and information integrity. Therefore, the shared content may be potentially stolen by a third party through, for example, phishing.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Embodiments of the invention described herein provide a secure exchange of data between mobile computing devices by ensuring that the information sender and the information receiver are who they say they are, and are located where they say they are. One embodiment of the invention may be characterized as a first mobile computing device. The first mobile computing device comprises a first application adapted to provide information to a server. The information, in turn, is adapted to be shared with at least one additional mobile computing device when the at least one additional mobile computing device is located within a specified range of the first mobile computing device. Additionally, the information is adapted to be shared when at least one of (i) a password is entered through a second application located on the at least one additional mobile computing device and (ii) the information is accessed by the at least one additional mobile computing device within a specified time period.

Another embodiment of the invention may be characterized as a method of sharing information between mobile computing devices. One method comprises locating a first mobile computing device at a first location and locating a second mobile computing device at a second location, with the second location being proximate the first location. The method then comprises sending content from the first mobile computing device to a network device. In one method, the content includes the first location, a location range for sharing the content, and a period of time for accessing the content. A request for the content is then sent from the second mobile computing device to the network device with the request comprising the second location, and in response to the request, the content is provided from the network device to the second mobile computing device.

Yet another embodiment of the invention may be characterized as a mobile computing system. One mobile computing system comprises a means for sharing content from a first mobile computing device. The first mobile computing device may comprise one or more first applications adapted to provide the content to share, a first API adapted to enable sharing criteria from the first mobile computing device and a first mobile operating system adapted to add a first mobile computing device location to a request to receive the content. The mobile computing system further comprises a means for requesting to receive the content to share, the request being sent from a second mobile computing device. One second mobile device comprises one or more second applications adapted to request the content to share, a second API adapted to enable a second mobile computing device sharing criteria, and a second mobile operating system adapted to add a second mobile computing device location to the content to share. The mobile computing system further comprises a means for receiving the content to share from the first mobile computing device at a network device comprising at least one database. The network device is adapted to write the content to share to the at least one database, receive the request for the content to share form the second mobile computing device, read the content to share from the at least one database, compare the first mobile computing device sharing criteria to the second mobile computing device sharing criteria, and send the content to share to the second mobile computing device.

And yet another embodiment of the invention may be characterized as a non-transitory, tangible computer-readable storage medium encoded with processor-readable instructions to perform a method of sharing content from a first mobile computing device. One method comprises enabling one or more sharing parameters for the content, providing the content to a server through a first communication channel, and providing a password to a second mobile computing device. The second mobile computing device is adapted to provide the password to the server through a second communication channel and request the content through the second communication channel. The password is provided to the second mobile computing device through a third communication channel.

BRIEF DESCRIPTION ON THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
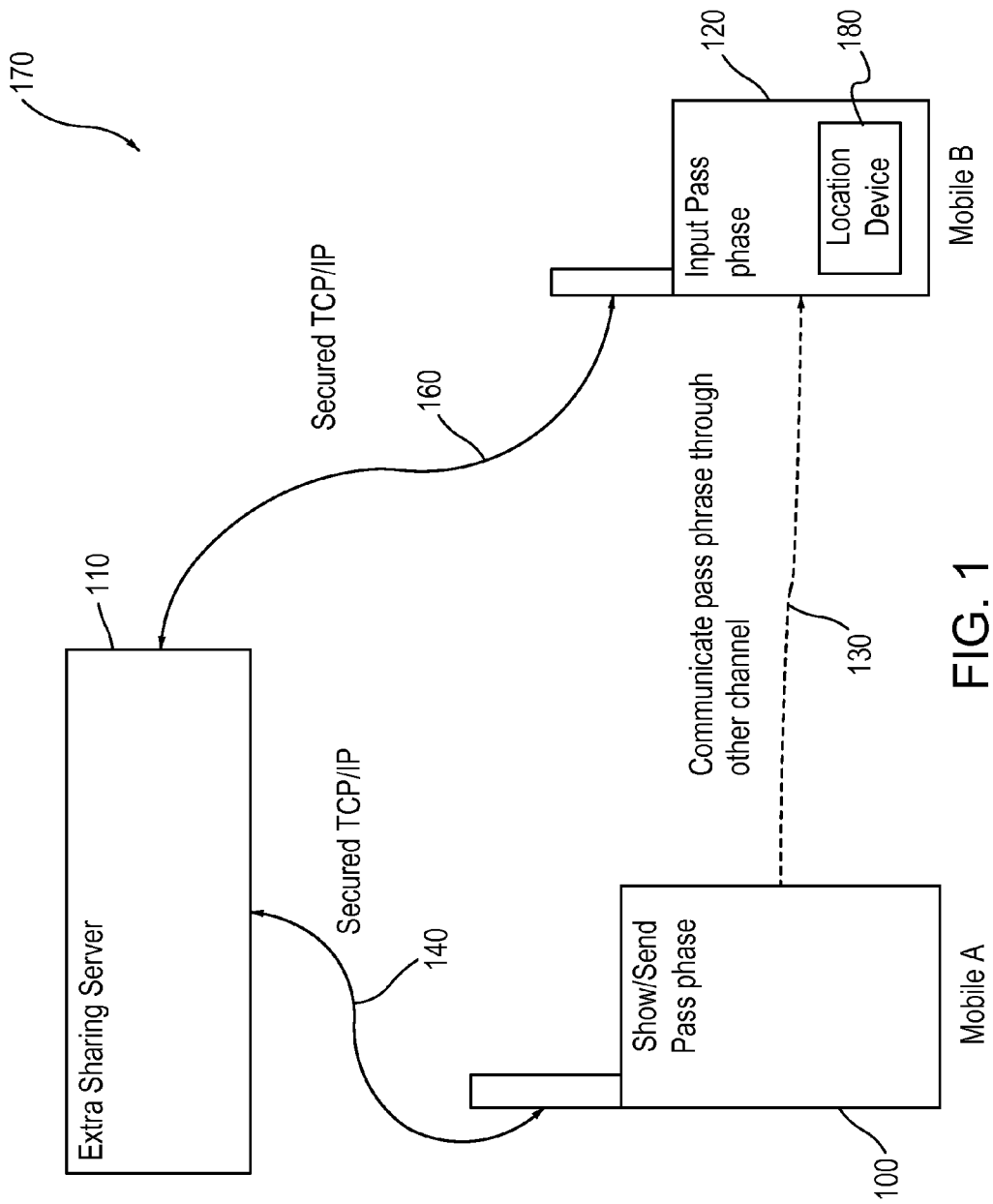
FIG. 1 illustrates a representation of communication between a first mobile computing device, a server, and at least one additional mobile computing device according to an exemplary embodiment of the present invention.

Turning first to FIG. 1, seen is a first mobile computing device 100 in a mobile computing system 170. One first mobile computing device 100 comprises a first mobile computing device operating system which may comprise an Android mobile operating system. The first mobile computing device 100 may also comprise at least one first application adapted to provide information to a server 110. In one embodiment, the application may be stored on a first mobile computing device memory, may comprise a SAAS application, or may comprise another application type known in the art. The information is adapted to be shared with at least one additional mobile computing device 120. At least one of the at least one additional mobile computing device 120 may comprise a second mobile computing device. In one embodiment, the information comprises data stored on the first mobile computing device memory such as, but not limited to, contact information. The information may also comprise content received via the first application, such as, but not limited to, web content. In one embodiment, the information may comprise HTML content. It is to be appreciated that the terms information, content, and data may be used interchangeably herein, where appropriate, to describe the information shared between devices.

In one embodiment, the information is shared from the first mobile computing device 100 to the at least one additional mobile computing device 120 when one or more sharing criteria provided by the at least one additional mobile computing device 120 matches one or more sharing criteria provided by the first mobile computing device 100. The parameters of the sharing criteria may be manually set by a first mobile computing device user or may be automatically set and/or provided by the first mobile computing device 100, the first application, or the server 110. The sharing criteria may be referred to throughout the application as sharing parameters, sharing criteria, parameters or criteria.

One of the sharing criteria comprises a location of the first mobile computing device 100 and a location of the at least one additional mobile computing device 120. The location of the at least one additional mobile computing device 120 may be referred to as a second location. The location of the first mobile computing device 100 may be referred to as a first location. In one embodiment, the information may be shared when the at least one additional mobile computing device 120 is located within a specified range (i.e., a location range) of the first mobile computing device 110. For example, upon launching the first application, a user of the first mobile computing device 100 may enter a range, relative to the first location, in the first application that the information may be shared within. For example, a user may enter a distance from the location of the first mobile computing device 100 as the location range. Alternatively, the location range may be automatically set by the first application or the server 110; for example, depending on the nature of the content (contact information, video clip, etc.) or the type of user (personal, corporate), the server 110 may automatically set a specific range. Therefore, in one embodiment, the first mobile computing device 100 provides a location of the first mobile computing device 100 and the location range to the server 110. The at least one additional mobile computing device 120 provides a location of the at least one additional mobile computing device 120 to the server 110. The location of each device is compared by the server 110 and if the two devices are within the range, the information may be shared between devices. Such a determination may comprise determining a distance the at least one additional mobile computing device 120 is from the first mobile computing device 100.

Another sharing criteria may comprise a password. In one embodiment, the information may be shared when a password entered through a second application located on the at least one additional mobile computing device 120 corresponds to a password entered through the first application. The password may be manually entered by the user of the first mobile computing device 100 and the user of the at least one additional mobile computing device 120 or the password may be automatically set by the first application and/or the second application. It is contemplated that the password may comprise one or more of text, picture(s), sound(s), vibration(s), and/or other device movements such as but not limited to, moving the device in a circular motion. Yet another sharing criteria may comprise a time period for accessing the data. Therefore, the information may be shared when the server 110 receives the password from both the first mobile computing device 100 and the second mobile computing device and determines the passwords are the same. Furthermore if the information is accessed by the at least one additional mobile computing device 120 within a specified time period, the information may be shared. The time period may be manually set by the user of the first mobile computing device 100 or automatically set by the first application or the server 110.

In one embodiment, the first application and the second application may comprise the same application, with separate instances of the application running on separate devices. The application may share information using HTTP protocol. At least one of the first application and the second application may comprise a web browser, where the information and sharing criteria may be entered through a website hosted by a web hosting device comprising the server 110. The information shared may comprise HTML content, one or more photos or the information may comprise one or more documents.

Figure 2:
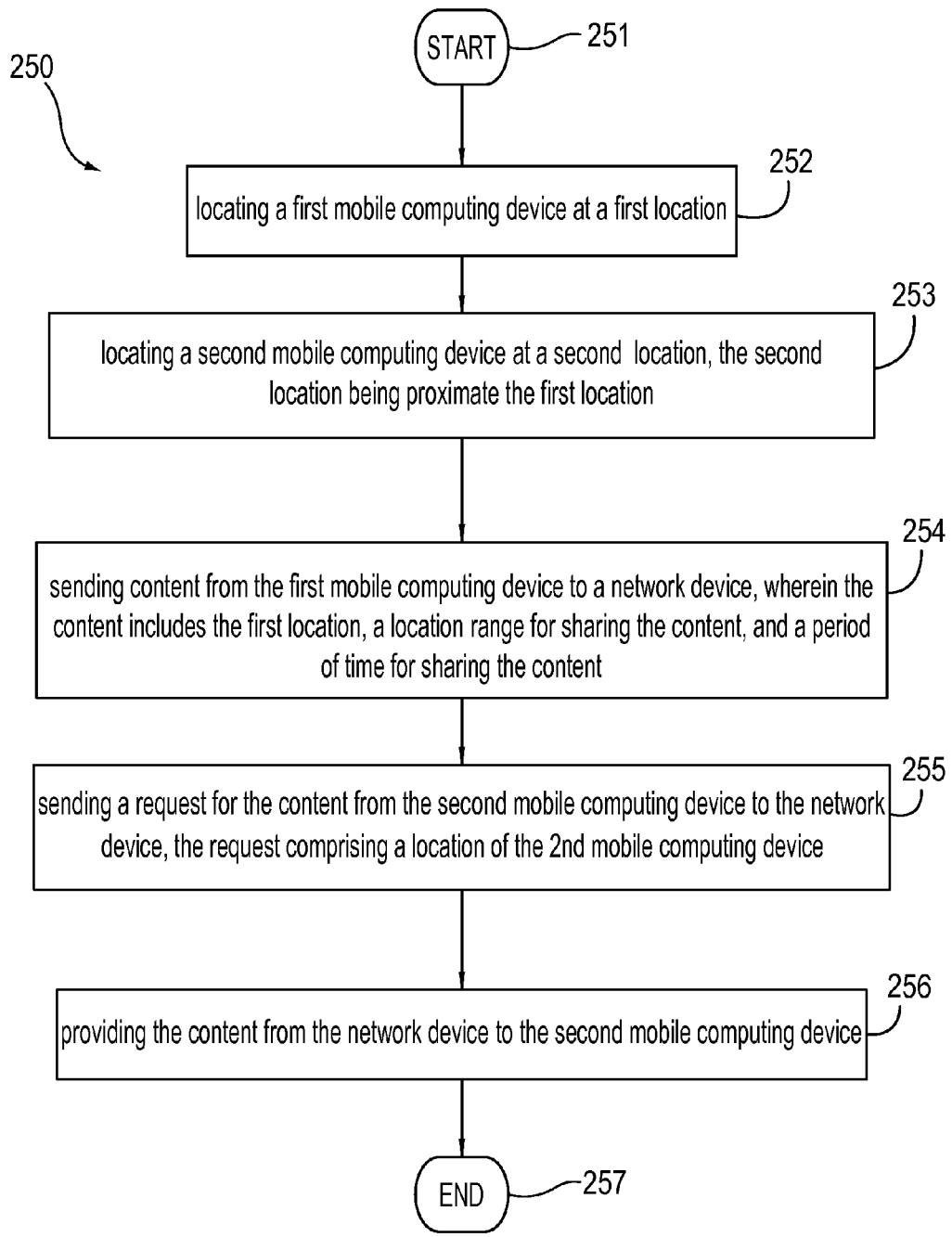
FIG. 2 is a flowchart that depicts a method that may be carried out in connection with the embodiments described herein.

Turning now the FIG. 2, seen is a method 250 of sharing information between mobile computing devices. One method 250 may comprise sharing information between the first mobile computing device 100 and the at least one additional mobile computing devices 120 of FIG. 1. One method 250 starts at 251 and at 252 comprises locating the first mobile computing device 100 at a first location. At 253 the method 250 comprises locating the second mobile computing device at a second location—where the second location is proximate to the first location. It is contemplated that in one embodiment, the two mobile computing devices may each be used by a different, or the same, mobile computing device user wishing to share information between the devices. For example, upon meeting at a restaurant, the two mobile computing device users may wish to securely share contact information so that the two users may contact each other at a later point in time.

At 254 one method 250 comprises sending content to share from the first mobile computing device 100 to a network device such as, but not limited to, the server 110. In one embodiment, the content comprises sharing criteria such as, but not limited to the first location, a location range for sharing the content, and a period of time for sharing the content. Other criteria are contemplated. In one embodiment, the first location may comprise a gps co-ordinate. However, other location-based information is also contemplated. For example, a location obtained from a Network Initiate Location Service may be provided. A period of time for sharing the content may be set by the user of the first mobile computing device 100. For example, the user may set a sharing period of 30 mins upon choosing information to share. Longer time periods may be desireable when the user of the first mobile computing device 100 anticipates sharing the same information to multiple mobile computing devices. In such a case, the user of the mobile computing device 100 may provide the same password to each additional mobile computing device 120 the information is sought to be shared with. Shorter periods of time are also contemplated. Therefore, upon the first application being launched on the first mobile computing device 100 and a first mobile computing device user selecting the information to share and initiating sharing of the information, the information may then be uploaded to the server 110 from the first mobile computing device 100 with the sharing parameters.

The location range may be adjusted depending on the nature of the information the user is sharing. For example, a smaller range such as, but not limited to, 5 m, may be chosen for sharing contact information to a single person. However, a larger range such as, but not limited to 250 m may be used when sharing, for example, corporate information related to a new product at a conference. Greater and smaller distances are also contemplated as well as an infinite range (available to all network users in any location) may be granted to users such as, but not limited to, corporate users providing coupon discounts or the like. Individual users may be able to enable or disable specific types of information sharing—such as disabling corporate sharing, etc., through the application.

At 255 the 250 method comprises sending a request for the content from the second mobile computing device to the network device, where the request comprises a location of the second mobile computing device. At any point after the sharing of the information is initiated, when the one or more additional mobile computing devices 120 launches the second application (such as, but not limited to, by accessing a website), a user of the one or more mobile computing devices 120 may enter a password in the second application. The second application may then send the request for the content from the second mobile computing device to the network device. Such a request may comprise the sharing criteria of the password, location, and time of the request. The information may be shared so long as the provided sharing criteria is within the range as set by the first application, are met. For example, the request for the content from the second mobile computing device may comprise the location of the second mobile computing device and may also comprise a location resolution, or accuracy. In one embodiment, the accuracy of the location of the second mobile computing device may be determined based on a location device 180, as seen in FIG. 1. For example, one location device 180 may be a GPS device located on the one or more mobile computing devices 120. Alternatively, the location device 180 may comprise at least one of hardware and software and may determine the location based on a cell-tower location that the second mobile computing device is connected to. Other location devices 180 are contemplated. Depending on the type of location device 180 used, the accuracy of the location of the second mobile computing device may be affected. For example, a GPS location device 180 may be accurate to within 5 m, while a second mobile computing device location determined from a cell tower location bay only be accurate to within 1 km. The accuracy of the second mobile computing device during a gps time-to-fix (TTF) may also be used. Whether the information is shared may be based on the accuracy of the location. For example, with a 5 m accuracy, the second mobile computing device location may be determined to be within the location range for the information to be shared. However, with a 1 km accuracy, the second mobile computing device may be determined to be inside or outside the range for sharing the information. In one embodiment, the user of the first mobile computing device 100, may adjust a setting for the accuracy of the location of the second mobile computing device. In one example with a 1 km accuracy, the outer location of the second mobile computing device may be determined to be 0.5 km away from the range of sharing the information, the information may not be shred. However, the information may be shared as well. The accuracy of the location, as well as whether the information is shared, may be device-dependent. Therefore, when the second mobile computing device is within the established range, the password is correct, and the second mobile computing device requests the information within the time period, the information is shared.

Figure 3:
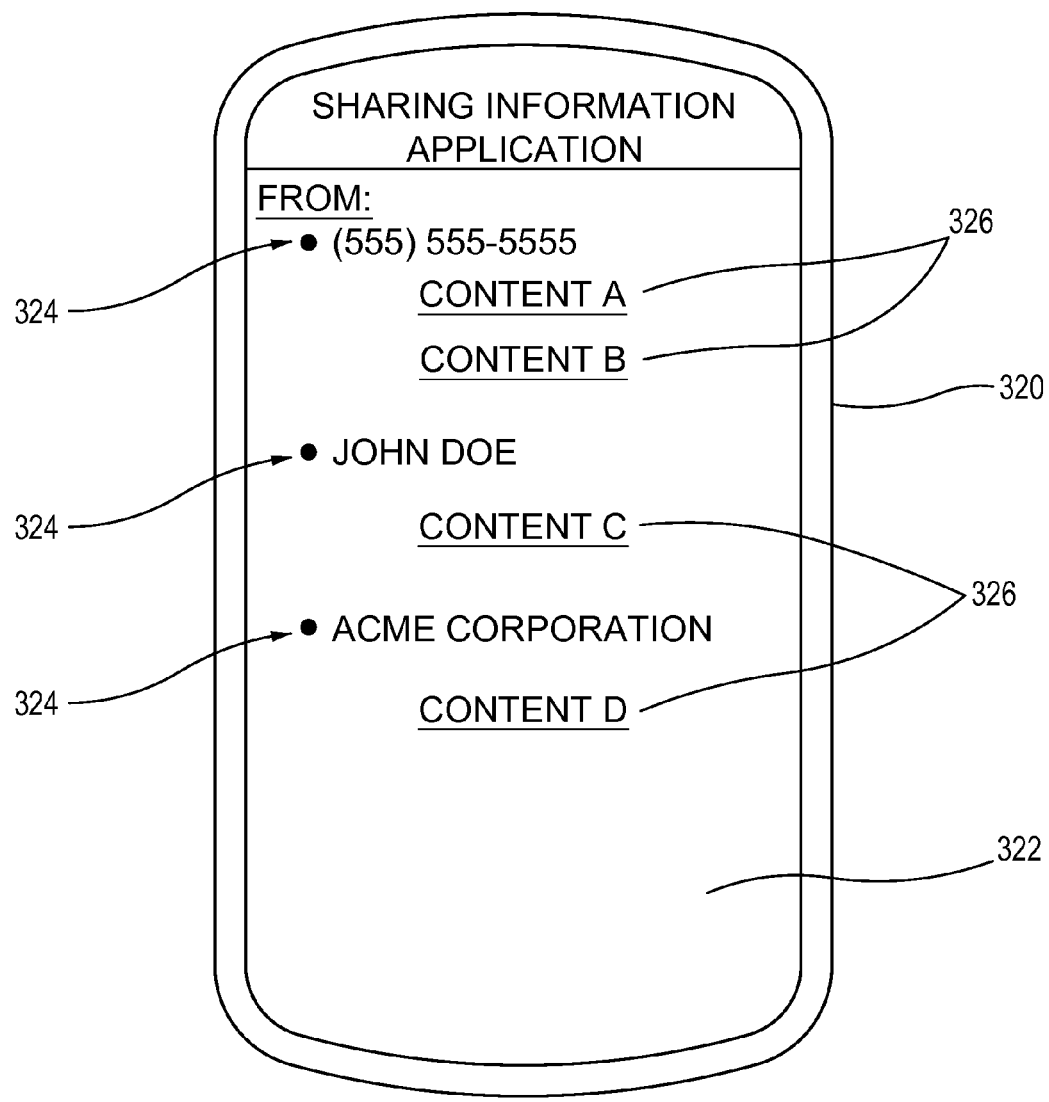
FIG. 3 illustrates a mobile computing device electronic display according to an exemplary embodiment of the invention.

Seen in FIG. 3. is one example of a graphical user interface (GUI) of a second application displayed on an electronic display 322 of one or more additional mobile computing devices 320. Such a display may be seen upon the second mobile computing device launching the second application, entering the password, and the sharing criteria being met at the network device. It is contemplated that the first mobile computing device 100 or second mobile computing device may compare the sharing criteria as well. In one embodiment, the second mobile computing device may receive the password from the first mobile computing device 100 across a communication channel 130 as seen in FIG. 1 such as, but not limited to, a Bluetooth communication channel. Other, communication channels 130 comprising secure communication channels are also contemplated.

As seen in FIG. 3, upon entering the password and meeting the parameters, the application may display one or more users 324. The one or more users 324 may be displayed as a phone number, a name that may be listed in a contact list on the one or more additional mobile computing device 320, or a name supplied by the application. For example, a user may register as "Acme Corporation" or any other screen name, which may be displayed to other users of the application. Content 326 provided from each of the one or more users 324 may also be displaced. For example a link may be provided for a user to click and receive the content 326 associated with that link. In one embodiment, the name displayed for the content 326 (Content A, etc) may be manually set by the first mobile computing device user or may be automatically set by the application. In other embodiments, the original content 326 provided to the second mobile computing device and displayed is not a link to additional content 326, but may be a display of the content 326 to share such as, but not limited to, a jpeg or text.

At 256 the method 250 comprises providing the content from the network device to the second mobile computing device. For example, upon clicking the link comprising the content 326, the server 110 may send information received from the first mobile computing device 100, and stored on the server 110, to the second mobile computing device, when the sharing criteria are met. Alternatively, the content 326 may be sent and displayed upon the password being entered. The method ends at 257.

Additional methods 250, not seen in FIG. 2, may include sending content 326 from the first mobile computing device 100 to a network device over a first connection 140. In one method, the first connection 140 may comprise a secured TCP/IP connection. The first connection 140 may be established upon launching the first application. A request for the content from the second mobile computing device to the network device may occur, and may provide the password to the network device over a second connection 160, which may also comprise a secure TCP/IP connection. The communication channel 130 in which the password is supplied from the first mobile computing device 100 to the second mobile computing device may comprise a third connection.

The first mobile computing device 100 may also send one or more content updates to the network device. For example, the password, content, or location range may be updated. In one embodiment, providing the content 326 from the network device to the second mobile computing device may comprise creating a list of the content provided to the second mobile computing device. One type of a content list is seen in the FIG. 3 list of the content 326 and users 324. Such a list may be provided in an HTML format to the second mobile computing device. Other formats and other content displays are contemplated. Filtering of which content 326 is displayed may also occur. For example, filtering may depend on the type of content 326 being shared, or the end user, mobile computing device type, and/or network carrier.

Figure 4:
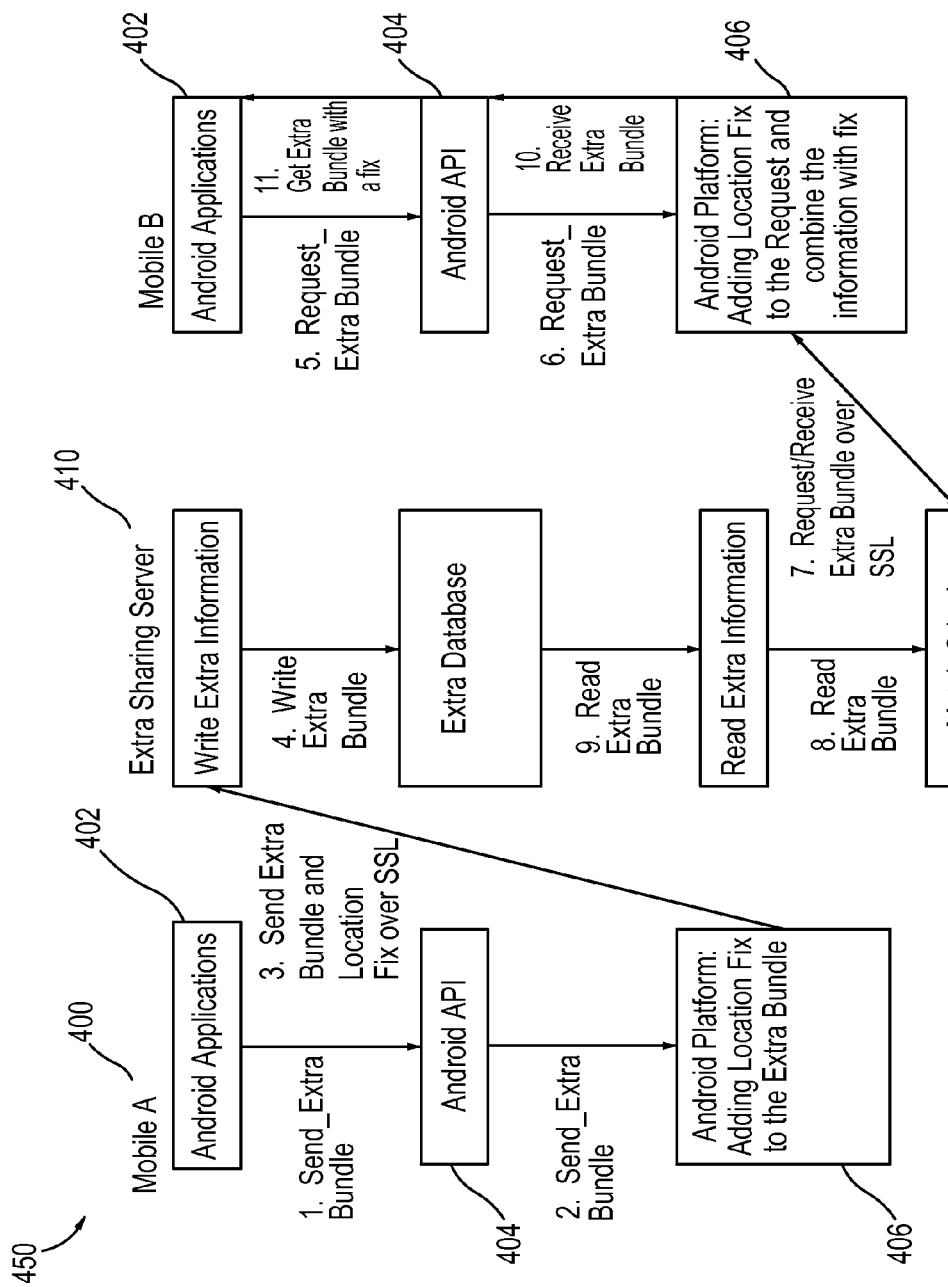
FIG. 4 illustrates a transfer of information between two mobile computing devices according to an exemplary embodiment of the invention.

Seen in FIG. 4 is one method 450 of exchanging information between mobile computing devices. IN one embodiment, at least one mobile computing device may comprise an Android device with an XTRA interface. In one method 450, the first mobile computing device 400, which may be referred to throughout the specification and figures as Mobile A, may comprise one or more applications 402 comprising Android Applications. At least one of the one or more applications 402 may send a Send Extra Bundle command to an Android API (Application Programming Interface) 404 on the first mobile computing device 400, which may be done through a SendExtraCommand interface. The Send Extra Bundle command may comprise HTML information to share. Similarly, a second mobile computing device, which may be referred to throughout the specification and figures as Mobile B, may also comprise one or more applications 402 that may comprise Android Applications where one of the one or more applications 402 may send a Request Extra Bundle command to the Android API 404 of the second mobile computing device. As seen in FIG. 4, the steps (comprising arrows) are each numbered 1-11, which refers to the order in which the steps may be taken. Therefore, the Request Extra Bundle may be the fifth step in the process and the Send Extra Bundle may be the first step in the process, in one method 450.

One second step may comprise the Android API 404 of the first mobile computing device 400 relaying the Send Extra Bundle command to the Android OS 406 of the first mobile computing device 400. The Android OS 406 may be referred to as the Android Platform. In one method 450, the Android OS 406 may add a location fix to the injected Extra Bundle, ensuring the integrity of the location fix for the information in the Extra Bundle for the first mobile computing device 400— since the location is being set by the mobile computing device itself. As a third step, the Android OS 406 may then send the Extra Bundle with the added location fix to the server 410, which may be referred to as the Extra Sharing Server. The server 410 may then perform a fourth step of a Write Extra Bundle command in writing the information and location fix to an Extra Database located on the server 410.

After the fifth step described above occurs after the Write Extra Bundle, similar to the first mobile computing device 400, the Android API 404 of the second mobile computing device sends the Request Extra Bundle to the Android OS 406 of the second mobile computing device. The Android OS 406 may add the location fix to the Request Extra Bundle, guaranteeing the location of the Request comes from the location of the second mobile computing device. At step 7, the server 410 is sent the Request Extra Bundle from the second mobile computing device. At step 8 the server 410 then matches the sharing criteria, such as, but not limited to, matching Mobile A location information with the Mobile B location information and determining if the locations coincide with the location range. At step 9, the information to be shared is read if the criteria is met and the information is then sent to Mobile B. At step 10 the Android API 404 performs the Receive Extra Bundle and at step 11, the Get Extra Bundle may be given to the application 402 through an Android Location Listener interface.

Figure 5:
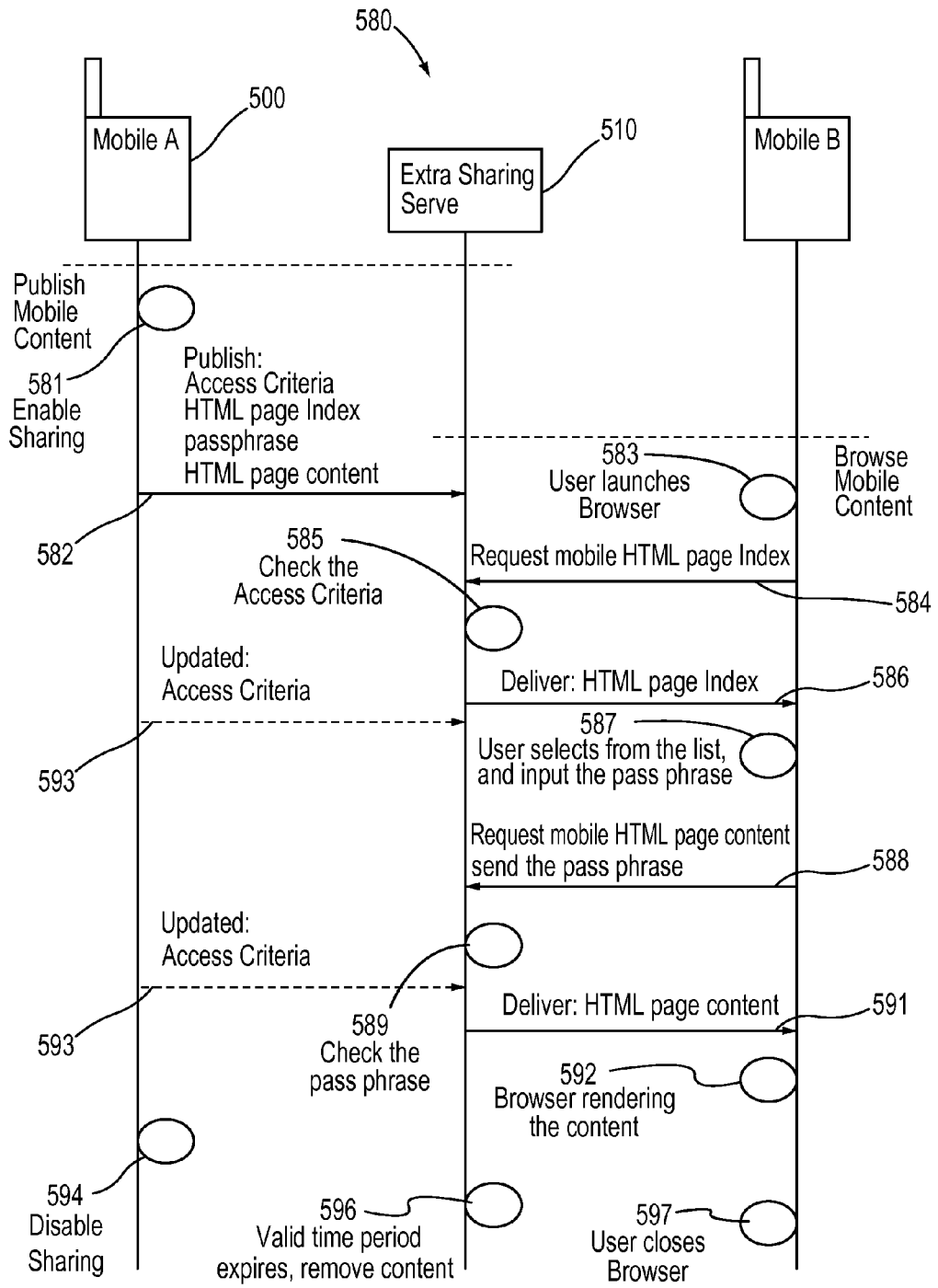
FIG. 5 illustrates a call flow for a transfer of information between two mobile computing devices according to an exemplary embodiment of the invention.

Seen in FIG. 5 is one example of a call flow 580 between the first mobile computing device 500, the second mobile computing device, and the server 510 in exchanging information from the first mobile computing device 500 to the second mobile computing device. The sharing of information may begin at 581, where the first mobile computing device 500 launches a sharing application. At 582, the first mobile computing device 500 publishes the information to share, which may comprise uploading an HTML index page, access criteria, password (passphrase), and the HTML page content to the server 510. At 583, the second mobile computing device may launch a sharing application, which may comprise a web browser. At 584, the second mobile computing device requests the information from the server 510 which in one call flow 580 comprises requesting a HTML page index from the server 510, and which may prompt the server 510 at 585 to check the access criteria and determine whether the second mobile computing device may receive the information. Access criteria refers to the sharing criteria. If the sharing criteria is satisfied, at 586, the server 510 delivers the HTML page index to the second mobile computing device. In one embodiment, the HTML page index may comprise the display 322 seen in FIG. 3.

At 587, the second mobile computing device may select a content link from the displayed HTML page index list and at 588 sends (i) a request for the HTML and (ii) a password to the server 510. At 589 the server 510 checks the password to ensure it is the same as the password supplied by the first mobile computing device 500. At 591, the HTML content is delivered to the second mobile computing device from the server 510 when the password is confirmed. At 592 the second mobile computing device renders the content, while at 594 the first mobile computing device 500 disables sharing, for example, by exiting the application. At 596 the server 510 removes the content from sharing or when the information is sent, upon expiration of the time period for sharing, and at 597 the second mobile computing device closes the application. At 593 seen are examples of updates of the access criteria from the first mobile computing device 500. For example, the first mobile computing device may update the time period or the range for accessing the content.

Returning now to FIG. 1 seen is the mobile computing system 170. One mobile computing system 170 comprises means for sharing content from the first mobile computing device 100. The system 170 may also comprise a means for requesting to receive the content, wherein the request is sent from a second mobile computing device that may comprise one of the one or more additional mobile computing devices 120. The content may be sent from a network device that may comprise the server 110. The first mobile computing device 100 may comprise one or more first applications such as, but not limited to, the one or more applications 402 of FIG. 4, adapted to share content between mobile computing devices. The system 170 may further comprise means for receiving the content at the network device from the first mobile computing device 100.

In one embodiment, the first mobile computing device 100 may also comprise a first API, which may comprise the Android API 404 seen in FIG. 4. The first API may be adapted to enable the sharing criteria for the first mobile computing device 100. The mobile computing device 100 may also comprise a first mobile computing device operating system which may comprise the Android OS 406. As explained with respect to FIG. 4, it may be the first mobile computing device operating system that assigns a location of the first mobile computing device 100 to the content. However, the location may also be provided from another portion of the mobile computing device 100.

The second mobile computing device may also comprise a second API adapted to enable sharing criteria for the second mobile computing device. The second mobile computing device may also comprise a second mobile operating system adapted to add a second mobile computing device location to the request to receive the content to share, and may comprise one or more applications 402 adapted to request the content to share.

In one embodiment, the network device may comprise at least one database and may be adapted to receive the content to share from the first mobile computing device 100, write the content to share to the at least one database, receive the request for the content to share from the second mobile computing device, and read the content to share from the at least one database. The network device may also review the first mobile computing device sharing criteria and the second mobile computing device sharing criteria, and send the content to share to the second mobile computing device when the sharing criteria of the two mobile computing devices are accepted by the network device.

In one system 170, at least one of the second mobile computing device and network device 110 may be adapted to compare the second mobile computing device location to a location of the first mobile computing device 100 and determine whether the second mobile computing device is located with an acceptable sharing range of the first mobile computing device location so that the second mobile computing device may receive the content 326. The system 170 may also comprise the first connection 140 which may comprise a first secure communication channel between the first mobile computing device 110 and the network device. The first communication channel may comprise a means to share the content. The second connection 160 may comprise a second secure communication channel, and may be located between the network device and the second communication device. The second connection 160 may be a separate communication channel from the first communication channel. The second communication channel may comprise a means to share the content. Finally, the third connection may also comprise the communication channel 130 comprising a third secure communication channel between the first mobile computing device 100 and the second mobile computing device. The third connection may be different than the first and second communication channels and may comprise a means to send a password between the devices.

In one embodiment, at least one of the first application and second application, first API and second API, and the first mobile operating system and second mobile operating system may be adapted to include in the content at least one of GNSS information and hardware-specific information. Such information may be used to determine whether the information should be shared. The first mobile computing device sharing criteria and the second mobile computing device sharing criteria may comprise the password shared across the third communication channel, and may also comprise a time-based sharing criteria such as, but not limited to, the time period for accessing the data. Additionally, at least one of the first and second application may comprise one or more applications comprising a web browser comprising a location-based add-on.

It is further contemplated that one embodiment of the invention may comprise a non-transitory, tangible computer-readable storage medium encoded with processor-readable instructions to perform a method of sharing content from the first mobile computing device 100. The non-transitory, tangible computer-readable storage medium may be stored on the first mobile computing device 100. One method of sharing content comprises enabling one or more content sharing parameters on the first mobile computing device 100, providing the content 326 to the server 110 through the first communication channel 140, and providing a password to a second mobile computing device. The second mobile computing device may be adapted to provide the password to the server through the second communication channel 160. The second mobile computing device may also request the content from the server through the second communication channel 160 and receive the password from the first mobile computing device 100 through the third communication channel 130. Furthermore, the content may comprise content in HTML format and the one or more sharing parameters may comprise a sharing range relative to a location of the first mobile computing device 100 and a sharing time limit. Additionally, the method may further comprise using a first mobile computing device Secure Platform Software to attach a first mobile computing device location to the content and disabling sharing of the content.

In conclusion, embodiments of the present invention enable a more secure exchange of information between mobile computing devices. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mobile computing device comprising a non-transitory, tangible computer-readable storage medium encoded with processor-readable instructions to provide information to a server, wherein,
   the information is identified to be shared by the server with at least one additional mobile computing device at a first time, wherein,
      the at least one additional mobile computing device is located within a user specified range of the mobile computing device;
      one or more sharing criterion provided from the mobile computing device corresponds to one or more sharing criterion received from the at least one additional mobile computing device, wherein the one or more sharing criterion comprises a password; and
      the information is accessed by the at least one additional mobile computing device at a second time within a non-coincident user-specified time period, wherein the second time being later than the first time.

2. The mobile computing device of claim 1 wherein the password comprises at least one of,
   text;
   a picture;
   a sound; and
   a device movement.

3. The mobile computing device of claim 1 further comprising,
an open source mobile operating system; and wherein,
the information comprises HTML content.

4. The mobile computing device of claim 1 wherein,
the information comprises, at least one of,
contact information,
one or more photos, and
one or more documents; and
the one or more sharing criterion further comprise a location of the first mobile computing device, a location of the at least one additional mobile computing device, and a user-specified sharing range.

5. A method of sharing information between mobile computing devices comprising,
locating a first mobile computing device at a first location;
locating a second mobile computing device at a second location without touching the first mobile computing device, wherein, the second location being proximate the first location;
sending content from the first mobile computing device to a network device, wherein the content includes,
the first location,
a user-specified location range for sharing the content, and
a first time of a non-coincident user-specified period of time for accessing the content;
sending a request for the content from the second mobile computing device to the network device, the request comprising,
the second location, and
a second time of a non-coincident user-specified period of time, the second time being later than the first time; and
providing the content from the network device to the second mobile computing device.

6. The method of claim 5 wherein,
sending content from the first mobile computing device to a network device comprises sending the content over a first connection between the first mobile computing device and the network device;
sending a request for the content from the second mobile computing device to the network device comprises, sending the request and providing a password to the network device over a second connection between the second mobile computing device and the network device; and further comprising,
providing the password from the first mobile computing device to the second mobile computing device over a third connection between the first mobile computing and the second mobile computing device prior to sending the request for the content from the second mobile computing device to the network device over the second connection between the second mobile computing device and the network device.

7. The method of claim 5 further comprising, sending a content update from the first mobile computing device to the network device.

8. The method of claim 5 wherein, providing the content from the network device to the second mobile computing device comprises,
creating a content list, and
providing the content list to the second mobile computing device; and further comprising,
selecting at least one content item from the content list; and
sending content associated with the at least one content item from the network device to the second mobile computing device.

9. The method of claim 8 further comprising, filtering the list on one of the network device and the second mobile computing device, wherein the filtering is based on a content type.

10. The method of claim 5 wherein, one of the first location and the second location comprise(s) a location determined from a network initiated location service.

11. The method of claim 5 wherein the first mobile computing device comprises,
at least one first non-transitory, tangible computer readable storage medium adapted to provide the content;
a first API adapted to enable a first mobile computing device sharing criteria; and
a first mobile operating system adapted to add sharing criteria comprising a first mobile computing device location to the content.

12. The method of claim 5 wherein, the second mobile computing device comprises,
at least one second non-transitory, tangible computer-readable storage medium adapted to request the content;
a second API adapted to enable a second mobile computing device sharing criteria; and
a second mobile operating system adapted to add a second mobile computing device location to the request to receive content.

13. The method of claim 5 further comprising,
writing the content to at least one database on the network device after sending the content from the first mobile computing device to a network device; and
reading the content from the at least one database after sending the request for the content.

14. The method of claim 11 further comprising, reviewing the first mobile computing device sharing criteria prior to providing the content.

15. The method of claim 12 further comprising, reviewing the second mobile computing device sharing criteria prior to providing the content.

16. The method of claim 5 further comprising,
comparing the second location to the first location; and
determining whether the second mobile computing device is located within the location range.

17. A non-transitory, tangible computer-readable storage medium encoded with processor readable instructions to perform a method of sharing content from a first mobile computing device comprising,
enabling one or more sharing parameters;
providing the content to a server through a first communication channel connection between the first mobile computing device and the network device;
providing a password to a second mobile computing device, wherein,
the second mobile computing device is adapted to,
provide the password to the server through a second communication channel between the second mobile computing device and the network device, and
request the content from the server through the second communication channel, and
the password is provided to the second mobile computing device through a third communication channel between the first mobile computing and the second mobile computing device; and providing to the server,
- a user-specified range from a first mobile computing device location to share the content, and
- a first time in a non-coincident user-specified period of time for the second mobile computing device to access the content, wherein, the second mobile computing device access the content at a second time in the non-coincident user-specified period of time, the second time being different than the first time.

18. The non-transitory, tangible computer-readable storage medium of claim 17, wherein the content comprises HTML content.

19. The non-transitory, tangible computer-readable storage medium of claim 17, the method further comprising, using a first mobile computing device secured platform software to attach a first mobile computing device location to the content.

20. The non-transitory, tangible computer-readable storage medium of claim 17, the method further comprising, disabling sharing of the content.

* * * * *